(12) United States Patent
Schmid

(10) Patent No.: US 6,433,679 B1
(45) Date of Patent: Aug. 13, 2002

(54) WARNING DEVICE FOR AN AUTOMOBILE

(75) Inventor: Dirk Schmid, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/554,940
(22) PCT Filed: May 22, 1999
(86) PCT No.: PCT/DE99/01523
§ 371 (c)(1),
(2), (4) Date: Jul. 13, 2000
(87) PCT Pub. No.: WO00/17016
PCT Pub. Date: Mar. 30, 2000

(30) Foreign Application Priority Data

Sep. 23, 1998 (DE) .......................................... 198 43 564

(51) Int. Cl.$^7$ ................................................ B60R 1/00
(52) U.S. Cl. ......................... 340/435; 340/436; 340/903
(58) Field of Search ................................ 340/435, 436, 340/463, 464, 468, 469, 901, 902, 903, 904; 701/96, 300; 180/167, 169, 197, 275

(56) References Cited

U.S. PATENT DOCUMENTS

| | | | | |
|---|---|---|---|---|
| 4,467,313 A | * | 8/1984 | Yoshino et al. | 340/904 |
| 5,314,037 A | * | 5/1994 | Shaw et al. | 340/903 |
| 5,450,057 A | * | 9/1995 | Watanabe | 340/435 |
| 5,572,484 A | * | 11/1996 | Gaus et al. | 340/435 |
| 5,574,426 A | * | 11/1996 | Shigal et al. | 340/435 |
| 5,641,093 A | * | 6/1997 | Kinoshita et al. | 340/439 |
| 6,091,323 A | * | 7/2000 | Kawai | 340/435 |
| 6,119,068 A | * | 9/2000 | Kannonji | 340/901 |

FOREIGN PATENT DOCUMENTS

| | | |
|---|---|---|
| DE | 38 13 083 | 11/1989 |
| DE | 42 09 047 | 8/1993 |
| DE | 196 38 703 | 4/1998 |
| EP | 0 419 399 | 3/1991 |

OTHER PUBLICATIONS

Lerner et al., Neil D., "Driver Backing Behavior Research Implications for Backup Warning Devices," Transportation Research Board, 76$^{th}$ Annual Meeting, Jan. 12–16, 1997, Washington, DC.

* cited by examiner

Primary Examiner—Van T Trieu
(74) Attorney, Agent, or Firm—Kenyon & Kenyon

(57) ABSTRACT

A warning device for monitoring a distance of a vehicle from an obstacle is described. The warning device includes at least one sensor for detecting an obstacle, an analyzing and controlling device for estimating a distance of the vehicle from the obstacle on the basis of an output signal of the at least one sensor, and at least one warning signal element controlled by the analyzing and controlling device to generate a near range warning signal when a distance estimated by the analyzing and controlling device is smaller than a limit value. The analyzing and controlling device includes a device for estimating a risk of collision of the vehicle with the obstacle on the basis of the estimated distance and a speed of the vehicle. The analyzing and controlling device controls the at least one warning signal element to output a far range warning signal when the estimated distance is greater than the limit value and the estimate indicates a risk of collision.

26 Claims, 2 Drawing Sheets

WARNING DEVICE FOR AN AUTOMOBILE

FIELD OF THE INVENTION

The present invention relates to a warning device that makes backing up a vehicle easier and safer by warning the driver of the vehicle of obstacles with which the vehicle might collide if it continues its movement.

BACKGROUND INFORMATION

A warning device of this type is known under the Bosch brand name Parkpilot system. With this known system, distance sensors integrated into the rear bumper use ultrasonic pulses based on the echo sounding principle to detect any objects behind the vehicle. The sensor signals are analyzed in an analyzing and controlling device that calculates the distance of the nearest object detected. As soon as the calculation indicates the presence of an obstacle less than 1.2 meters away from the vehicle, the driver is warned in the form of an intermittent audio signal. The pause between individual tones of the signal becomes shorter as the vehicle approaches the obstacle, until the signal becomes a continuous tone at a distance of 30 cm. At the same time, the distance is displayed on a multicolor LED display mounted in the rear of the vehicle.

Such a system is effective in parking a vehicle, where the vehicle is usually moving at very low speeds and its stopping distance is usually negligible, and the driver is dependent on information about any possible obstacles that might be located even approximately in the direction of travel of his/her vehicle.

When backing at a high speed over a great distance, the effectiveness of this system is limited because the time available between the occurrence of a warning signal and collision with the obstacle is often too short to be able to avoid it.

Although it would be technically feasible to expand the range covered beyond the abovementioned 1.2 meter detection radius, this would result in detection and signaling of a multiplicity of objects that are irrelevant for backing the vehicle, for example, because they are too far away from the direction of vehicle travel to actually be an obstacle. The driver would find this superfluous information annoying.

Another warning system is described in the article by Neil D. Lerner et al. "Driver Backing Behaviour Research Implications for Backup Warning Devices" (preprint) *Transportation Research Board*, 76th Annual Meeting, Jan. 12–16, 1997, Washington, D.C. This system is activated when the vehicle is shifted into reverse gear. One or more distance sensors detect objects at a distance of approximately one meter to ten meters behind the vehicle. A control unit analyzes the distance information and decides whether there is a risk of collision. The criterion for this is the time until reaching the object (time to collision (TTC)). The study by Lerner has shown that with an intentional approach to an object by a driver, the TTC is normally more than two seconds. However, when the TTC is less than two seconds, there is a high probability that the driver has not seen the obstacle. Thus, there is an acoustic collision warning when the system calculates a TTC of less than 1.5 to 2 sec. The system detects the following information for determination of the TTC:

object distance and approximate object position,
speed of the object and the vehicle,
instantaneous vehicle acceleration or deceleration, and
steering angle.

Extending the collision warning range to distances of less than one meter is problematical, because the warning strategy can no longer be implemented appropriately here. Although the speeds occurring in the usual parking maneuvers are low, they change very rapidly, so that a calculation of TTC is subject to great inaccuracies. Thus, reliable warning of collisions is impossible at distances of less than one meter on the basis of the TTC criterion.

SUMMARY OF THE INVENTION

The warning device according to the present invention offers the advantage that it can be used appropriately in both the near range of the vehicle at distances of less than 1.5 meters as well as at a greater distance of up to approximately ten meters, and in both distance ranges it supplies the driver with warnings of any obstacles only when actually necessary. By producing different warning signals, depending on whether an obstacle is in the near range of the vehicle or at a greater distance from it, this ensures that the driver can properly interpret the perceived warning signal and react to it in an appropriate manner.

The radius of the near range may vary according to the model of the vehicle and the driver's range of vision in the reverse direction; for example a radius of 1 to 1.5 meters, typically 1.2 meters is a good guideline value for the limit between the near and far range.

To inform the driver quantitatively about the estimated distance from an obstacle or the extent of the risk of collision, the warning signals may be intermittent signals whose period or pulse duty factor may vary according to the estimated distance or the estimated risk of collision. The warning signals may both be acoustic signals, for example. This permits the use of a joint loudspeaker or loudspeaker system as the warning signal element to produce both signals. The warning signals may also be visual, e.g., an arrangement of LEDs may be used as the warning signal element. For example, the number of LEDs activated may be used as a measure of the estimated distance, and the LEDs may flash with different periods or pulse duty factors to signal a risk of collision with an obstacle at a distance greater than the limit value.

The situation could occur where the warning device detects a risk of collision with an obstacle in the far range beyond the limit value, and consequently outputs the far range warning signal until the time of occurrence of the obstacle in the near range below the limit value. In such a case, the far range warning signal should still be generated even when the obstacle has entered the near range, because if the far range warning signal were to stop suddenly, even if the near range warning signal were to begin to sound at the same time, this could mislead the driver to think that the risk of collision causing the warning signal has been eliminated. Therefore, the present invention advantageously provides for the analyzing and controlling device to continue output of the far range warning signal by the signal element in such a case. The far range warning signal stops only when it is estimated that there is no longer a risk of collision, e.g., because the vehicle has been braked to a sufficient extent or the direction of travel has changed or the obstacle has left the detection range of the sensor.

To avoid annoying the driver with a long-lasting near range warning signal, a switch is provided in a further embodiment of the present invention for blocking output of the near range warning signal. The analyzing and controlling device is equipped to cancel the block as soon as the estimate indicates that the obstacle is no longer in the near range, i.e., the distance from the obstacle is greater than the limit value. This embodiment of the analyzing and controlling device ensures that the near range warning signal will be triggered each time an obstacle enters the near range, even if the switch has been activated with an earlier backing maneuver.

According to another advantageous embodiment of the present invention, the warning device is equipped to detect the direction of an obstacle and it includes a plurality of similar warning signal elements which are distributed in the vehicle and are controlled as a function of the direction detected to indicate this direction to the driver. This makes it possible for the driver to perceive directly the direction into which the driver must steer to avoid the obstacle even if the obstacle is out of sight, e.g., because it is too low and is already too close to the vehicle.

Depending on the distance range to be detected, different sensors may be used to detect obstacles. A sensor used for detection in the near range should have a broad horizontal detection characteristic to be able to detect obstacles located beyond of the current path of the vehicle, whereas a sensor provided for detecting obstacles in the far range should have a narrower horizontal detection characteristic for detection of obstacles essentially only in the direction of vehicle travel. Primarily, ultrasonic sensors are used as the sensors for the near range; for example ultrasonic sensors, lidar or radar sensors may be used for greater distances.

DETAILED DESCRIPTION

Figure 1:
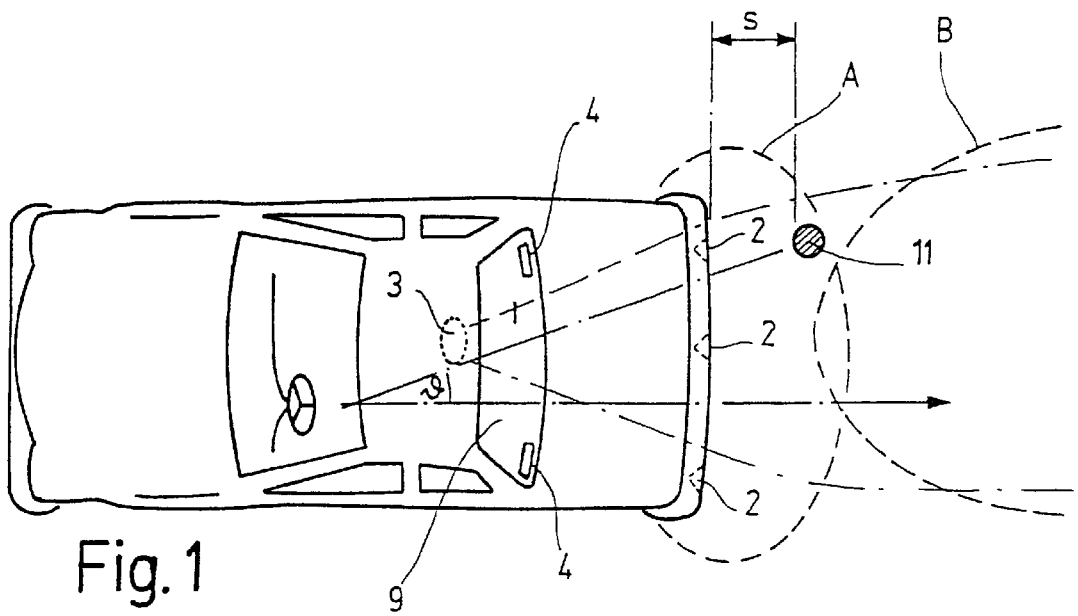
FIG. 1 shows a top view of a motor vehicle having a warning device according to the present invention.

FIG. 1 shows a top view of a motor vehicle having possible arrangements of sensors and warning signal elements.

The warning device is activated automatically when the vehicle is shifted into reverse gear. According to a first embodiment, it includes a plurality of ultrasonic sensors 2 that are integrated into a rear bumper 1 of the vehicle. Each of these sensors periodically emits an ultrasonic pulse and records the echo returning from an obstacle 11. The portion of the echo signal corresponding to a transit time of the ultrasonic pulse of 2×1.2 m/c, where c is the speed of sound of 330 m/s in air, is processed by an analyzer unit 5 (see FIG. 2) to detect obstacles at a distance of up to 1.2 meters. This yields near range detection zone A of ultrasonic sensors 2 as limited by a dotted line.

Analyzer unit 5 also detects the echo signals received by all ultrasonic sensors 2 in a transit time interval for each pulse emitted by one of the ultrasonic sensors, corresponding to distances of approx. 1.2 to 10 meters between sensors 2 and the object from which the echo is reflected. By taking into account only echo signals having a certain maximum phase shift, a directional characteristic of the totality of sensors 2 can be achieved, corresponding approximately to the far range labeled as B.

According to a second embodiment, for detection of obstacles in the near range at a distance of less than 1.2 meters, sensors 2 are used exactly as in the first embodiment, but the far range of up to approximately 10 meters is detected by a sensor 3, which has a narrower directional characteristic and can be mounted beneath the head liner of the vehicle, and may be, for example ultrasonic sensor or a lidar or radar sensor.

Analysis of differences in transit time and/or intensity between echo signals received by different sensors 2 allows analyzer unit 5 to estimate not only distance s from obstacle 11 but at the same time also angle θ assumed by obstacle 11 with respect to the direction of travel of the vehicle (based on the position of the driver in FIG. 1).

Figure 2:
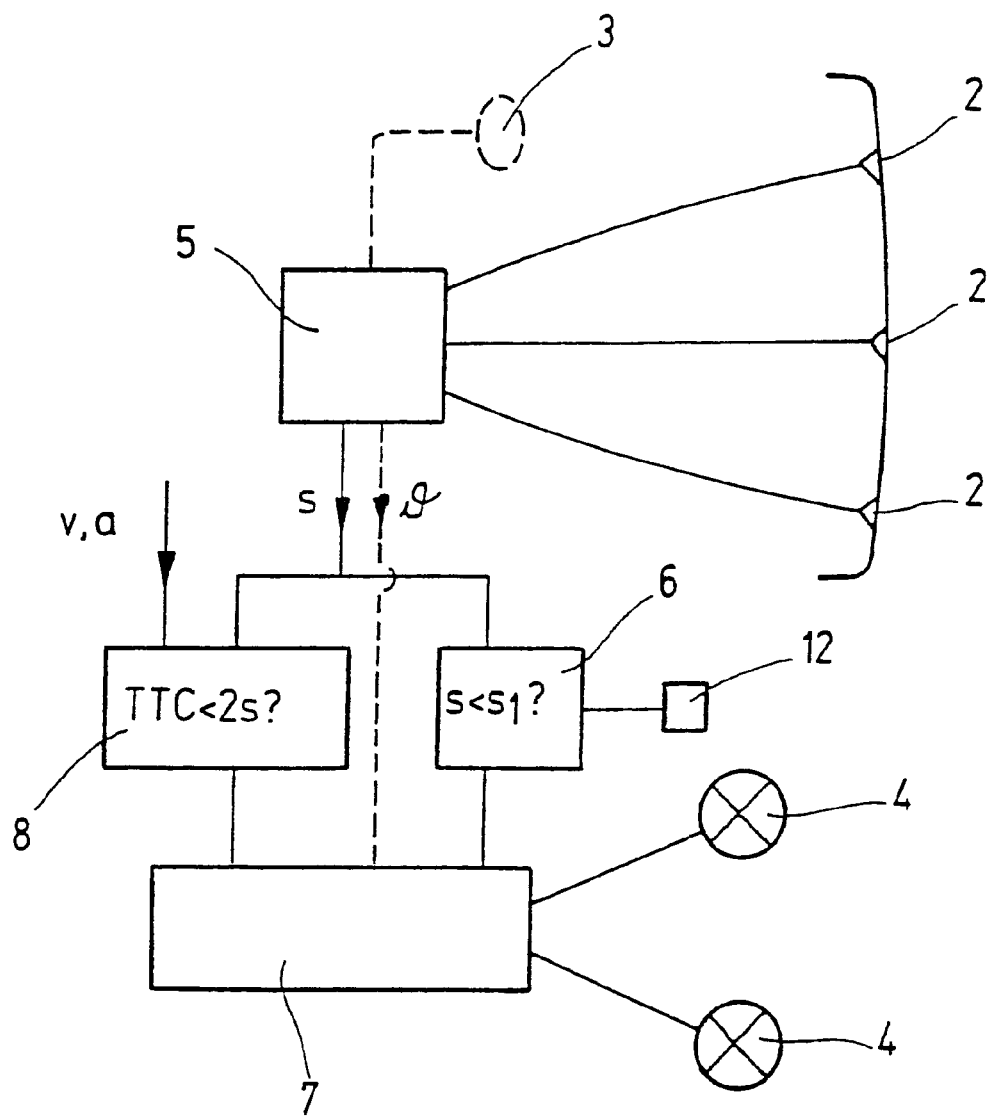
FIG. 2 shows a schematic block diagram of a warning device according to the present invention.

FIG. 2 shows in highly schematic form the design of a warning device according to the present invention. It includes an analyzer unit 5 that receives echo signals from a plurality of ultrasonic sensors 2 and estimates distance s of an obstacle from the vehicle. The blocks shown in FIG. 2 can be implemented in the form of hardware or software.

A signal representative of the estimated distance is output to a comparator unit 6 that compares this distance with a limit value s, and when the comparison shows that $s<s_1$ it delivers a command for generating a near range warning signal to a signal element control unit 7.

By depressing a key 12, the driver can terminate output of the command to the signal element control unit if he or she perceives it as annoying. After depressing key 12, comparator unit 6 remains in a blocked state where output of the command is suppressed as long as estimated distance s, is less than s. As soon as the vehicle is a greater distance away from the obstacle than $s_1$, comparator unit 6 returns to its normal state, so that the near range warning signal is generated again when another obstacle comes within the near range. Depressing key 12 when no obstacle is detected in the near range cannot put the comparator unit in the blocked state and therefore has no effect. This rules out the possibility of deactivating the near range warning signal at a time when the driver is relying on receiving a warning if necessary.

The signal from analyzer unit 5 is also supplied to a computer unit 8 that also receives a vehicle speed signal, and optionally a vehicle acceleration signal and a steering angle signal. On the basis of estimated distance s, the speed of the vehicle and optionally the acceleration, computer unit 8 calculates time TTC needed by the vehicle to reach the obstacle and it estimates the risk of collision of the vehicle with the obstacle on the basis of this calculation. If TTC is less than a threshold value $t_c$ between, for example, 1.5 and 2 seconds, it is estimated that there is a risk of collision, and the computer unit delivers a command for generating a far range warning signal to the signal element control unit.

The commands for generating a near range warning signal and/or a far range warning signal are, for example, signals containing quantitative information about estimated distance s or calculated time TTC.

Depending on the received commands, signal element control unit 7 controls two warning signal elements 4 that are fields of luminous elements of different colors, e.g., LEDs, LCD segments, incandescent lamps or display elements of the like according to one variant of the present invention. Warning signal elements 4 are arranged in the right and left edge areas of rear window 9 of the vehicle, e.g., on the rear window shelf. Thus, at least one of two warning signal elements 4 is constantly in sight of the driver looking through the rear window when backing up.

As indicated with reference to FIG. 1, a sensor 3 having a narrower directional characteristic may be used in addition to ultrasonic sensors 2 to detect obstacles at a greater distance in the range of 1.2 to 10 meters. This sensor 3 is shown by dotted lines in FIG. 2. Its signal is optionally also analyzed by analyzer unit 5 and converted together with signals from sensors 2 into a uniform distance signal s.

As already indicated with reference to FIG. 1, according to one embodiment of the present invention, it is possible to determine the direction of an obstacle and to output a signal representing this direction θ by taking into account differences between signals of analyzer unit 5 detected simultaneously by different sensors 2. This signal can then be analyzed by signal element control unit 7 to control two warning signal elements 4 differently according to direction θ. Thus, of the two warning signal elements 4, for example, it is possible to control only that warning signal element, on whose side the obstacle was detected, to output a warning signal, or the indicated urgency of the warning signal may vary for the two warning signal elements 4 according to the direction of the obstacle. In conjunction with the information about the steering angle, it is possible to detect on the basis of θ whether an object detected is beside the path of the vehicle. In this case, a far range warning is suppressed.

Figure 3:
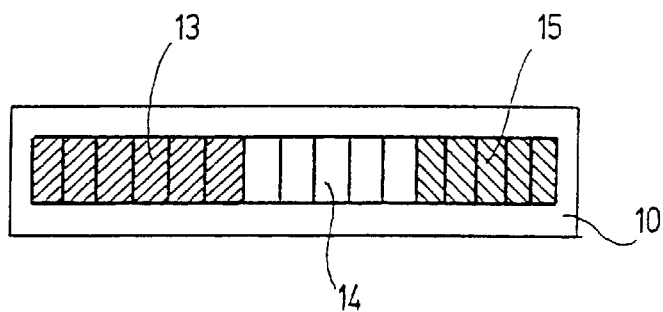
FIG. 3 shows a visual warning signal element.

FIG. 3 shows an example of a warning signal element 4 for use with a warning device according to the present invention. The warning signal element includes a line of green, yellow and red LEDs 13, 14, 15 in a frame 10. When signal element control unit 7 receives a far range warning command from computer unit 8, it causes all the elements in the line to flash. The flash rate may assume different values, depending on the calculated TTC value, so that different collision risks can be indicated to the driver.

However, when signal element control unit 7 receives a near range warning command from comparator unit 6, it controls a different number of LEDs in warning signal element 4 according to estimated distance s encoded in the command. If s is only slightly below limit value $s_1$, signal element control unit 7 first activates only a single green LED 13, with the number of LEDs increasing with a decrease in distance s and with yellow LEDs 14 and finally red LEDs 15 being activated in succession.

Instead of visual warning signal elements like the LEDs shown in FIG. 3, acoustic signal elements such as loudspeakers may also be used according to another variant of the present invention. These loudspeakers may be the loudspeakers of a car stereo system, for example, in which case signal element control unit 7 will interrupt the loudspeaker connection to the stereo system at the same time as when it is controlling the loudspeakers to generate a warning signal.

According to this embodiment, when signal element control unit 7 receives a far range warning command from computer unit 8, it delivers an intermittent audio signal at a readily audible frequency to warning signal element 4, where the period or pulse duty factor of the intermittent signal may depend on a value of TTC encoded in the command to ultimately allow the driver to differentiate between different levels of urgency of the collision warning.

When signal element control unit 7 receives a near range warning command from comparator unit 6, it first checks on whether a far range warning command has already been received. If this is the case, the near range warning command is at first ignored by comparator unit 6, and a far range warning signal is still output according to the command received by computer unit 8. If there is no far range warning command when a near range warning command arrives, or if computer unit 8 has terminated output of its command, signal element control unit 7 will take into account the near range warning command and will cause warning signal element 4 to output a near range warning signal with a tone level which differs markedly from that of the far range warning signal triggered by computer unit 8.

The far range warning signal usually has the function of warning the driver of an unexpected risk of collision, whereas the near range warning signal may usually occur only when the vehicle is backing up slowly, when the driver is usually anticipating an obstacle and is therefore deliberately listening for the signal; therefore, the attention value of the near range warning signal may be lower than that of the far range warning signal, i.e., it may be softer or its tone level may be lower.

Figure 4:
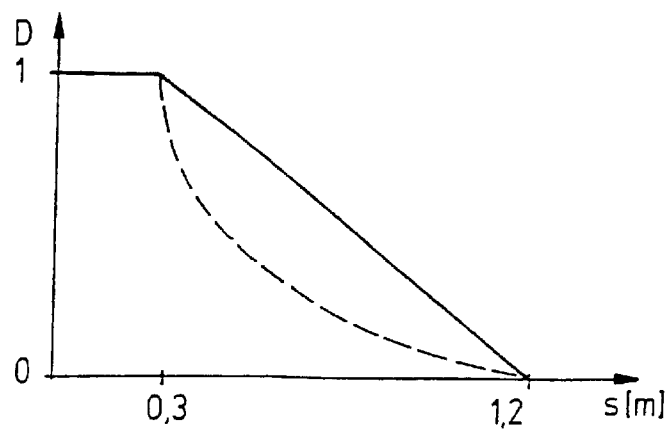
FIG. 4 shows a plot of a pulse duty factor of an intermittent warning signal as a function of a distance from an obstacle.

In this embodiment, the near range warning signal is also an intermittent signal. The frequency of the signal is fixed; its pulse duty factor, i.e., the ratio of the duration of an individual signal tone to the period of the signal, depends on the estimated distance of the vehicle from the obstacle. Two examples of such a dependence are shown in FIG. 4. When the vehicle approaches an obstacle, a near range warning signal begins to be generated when the distance is less than a limit distance $s_1$ of 1.2 meters in this case. According to a first variant, corresponding to the solid line in FIG. 4, there is a linear increase in pulse duty factor D with a decrease in distance until reaching a value of 1 at a distance of approximately 0.3 meter. Thus at this distance, the intermittent signal develops into a continuous tone.

According to a second variant, illustrated by the dotted-line curve in FIG. 4, pulse duty factor D of the first warning signal increases slowly at first with a decrease in distance when the distance is less than a limit distance $s_1$ of 1.2 meters, then increases very rapidly just before reaching a distance of 0.3 meter, finally becoming a continuous tone when the distance is less than 0.3 meter. With this curve, the increase in the risk of collision with the obstacle with a decrease in distance is more clearly obvious to the driver than in the first variant, because the warning signal is much more clearly perceptible in the distance range where a reaction on the part of the driver is urgently necessary than at greater distances, which do not require an immediate reaction.

If signal element control unit 7 together with loudspeakers is used as warning signal element 4 in a warning device that is capable of detecting direction e of an obstacle with respect to the vehicle and supplying a corresponding signal to the signal element control unit, as illustrated in FIG. 2, then signal element control unit 7 is, for example, equipped with a stereo output, making it possible to adjust the phase angle of the warning signals output to the two loudspeakers according to the detected direction of the obstacle, so that driver A is capable of assigning the warning signal a direction from which it seems to come and which corresponds to the actual direction θ of the obstacle.

What is claimed is:

1. A warning device for monitoring a distance of a vehicle from an obstacle, comprising:
   at least one sensor for detecting an obstacle;
   an analyzing and controlling device for estimating a distance of the vehicle from the obstacle as a function of an output signal of the at least one sensor, the analyzing and controlling device including a device for estimating a risk of collision of the vehicle with the obstacle as a function of the estimated distance and a speed of the vehicle; and
   at least one warning signal element controlled by the analyzing and controlling device, the analyzing and controlling device controlling the at least one warning signal element to output a near range warning signal when the estimated distance is less than a limit value, the analyzing and controlling device controlling the at least one warning signal element to output a far range warning signal when the estimated distance is greater than the limit value and the estimated risk indicates that there is a risk of collision;

wherein the limit value is between a near range and a far range, and the limit value depends on a vehicle type.

2. The warning device according to claim 1, wherein:
the limit value is between 1 meter and 1.5 meters.

3. The warning device according to claim 1, wherein:
the near range warning signal is an intermittent signal, at least one of a period and a pulse duty factor of the intermittent signal indicating the estimated distance.

4. The warning device according to claim 3, wherein:
the near range warning signal and the far range warning signal are acoustic signals differing in tone level.

5. The warning device according to claim 3, wherein the near range warning signal is an acoustic signal and the far range warning signal is a visual signal, the visual signal differing in at least one of color and intensity as a function of the estimated risk.

6. The warning device according to claim 3, wherein the near range warning signal is a visual signal and the far range warning signal is an acoustic signal, and the acoustic signal differing in at least one of tone and volume as a function of the estimated risk.

7. The warning device according to claim 1, wherein:
the far range warning signal is an intermittent signal, at least one of a period and a pulse duty factor of the intermittent signal indicating the estimated risk of collision.

8. The warning device according to claim 7, wherein the near range warning signal is an acoustic signal and the far range warning signal is a visual signal, and the visual signal differing in at least one of color and intensity as a function of the estimated risk.

9. The warning device according to claim 7, wherein the near range warning signal is a visual signal and the far range warning signal is an acoustic signal, and the acoustic signal differing in at least one of tone and volume as a function of the estimated risk.

10. The warning device according to claim 7, wherein the near range warning signal and the far range warning signal are acoustic signals differing in tone.

11. The warning device according to claim 1, wherein:
the analyzing and controlling device controls the at least one warning signal element to output the far range warning signal when an obstacle is at a distance less than the limit value and the estimated risk indicates that there is a risk of collision at the time the obstacle appears.

12. The warning device according to claim 1, further comprising:
a switch for blocking output of the near range warning signal, the analyzing and controlling device being equipped to cancel the blocked output of the near warning signal as soon as the estimated distance is greater than the limit value.

13. The warning device according to claim 1, wherein:
the at least one sensor includes at least one sensor of a first type and at least one sensor of a second type, the first type having a broad horizontal detection characteristic for estimating distances less than the limit value, the second type having a narrow horizontal detection characteristic for estimating distances greater than the limit value.

14. The warning device according to claim 13, wherein:
the at least one sensor of the first type is an ultrasonic sensor.

15. The warning device according to claim 13, wherein:
the at least one sensor of the second type is one of an ultrasonic sensor, a lidar sensor, and a radar sensor.

16. The warning device according to claim 1, wherein the estimated risk is based on a comparison of a threshold value and an estimated time to reach the obstacle.

17. The warning device according to claim 16, wherein the estimated time is based on the speed and the estimated distance.

18. The warning device according to claim 16, wherein the threshold value is at least 1.5 seconds.

19. The warning device according to claim 16, wherein the threshold value is between about 1.5 and 2 seconds.

20. The warning device according to claim 16, wherein there is a collision risk when the estimated time is less than the threshold value.

21. The warning device according to claim 20, wherein the threshold value is at least 1.5 seconds.

22. The warning device according to claim 20, wherein the threshold value is between about 1.5 and 2 seconds.

23. A warning device for monitoring a distance of a vehicle from an obstacle, comprising:
at least one sensor for detecting an obstacle;
an analyzing and controlling device for estimating a distance of the vehicle from the obstacle as a function of an output signal of the at least one sensor, the analyzing and controlling device including a device for estimating a risk of collision of the vehicle with the obstacle as a function of the estimated distance and a speed of the vehicle; and
at least one warning signal element controlled by the analyzing and controlling device, the analyzing and controlling device controlling the at least one warning signal element to output a near range warning signal when the estimated distance is less than a limit value, the analyzing and controlling device controlling the at least one warning signal element to output a far range warning signal when the estimated distance is greater than the limit value and the estimated risk indicates that there is a risk of collision;
wherein:
the near range warning signal is an intermittent signal, at least one of a period and a pulse duty factor of the intermittent signal indicating the estimated distance; and
the near range warning signal and the far range warning signal are visual signals differing in color.

24. The warning device according to claim 23, wherein the limit value is between a near range and a far range, and the limit value depends on a vehicle type.

25. A warning device for monitoring a distance of a vehicle from an obstacle, comprising:
at least one sensor for detecting an obstacle;
an analyzing and controlling device for estimating a distance of the vehicle from the obstacle as a function of an output signal of the at least one sensor, the analyzing and controlling device including a device for estimating a risk of collision of the vehicle with the obstacle as a function of the estimated distance and a speed of the vehicle;

at least one warning signal element controlled by the analyzing and controlling device, the analyzing and controlling device controlling the at least one warning signal element to output a near range warning signal when the estimated distance is less than a limit value, the analyzing and controlling device controlling the at least one warning signal element to output a far range warning signal when the estimated distance is greater than the limit value and the estimated risk indicates that there is a risk of collision; and a plurality of similar warning signal elements distributed in the vehicle and operated as a function of a direction of an obstacle, the plurality of similar warning signal elements indicating the direction of the obstacle to a driver, the direction of the obstacle being detected by the warning device.

26. A warning device for monitoring a distance of a vehicle from an obstacle, comprising:

at least one sensor for detecting an obstacle;

analyzing and controlling device for estimating a distance of the vehicle from the obstacle as a function of an output signal of the at least one sensor, the analyzing and controlling device including a device for estimating a risk of collision of the vehicle with the obstacle as a function of the estimated distance and a speed of the vehicle; and at least one warning signal element controlled by the analyzing and controlling device, the analyzing and controlling device controlling the at least one warning signal element to output a near range warning signal when the estimated distance is less than a limit value, the analyzing and controlling device controlling the at least one warning signal element to output a far range warning signal when the estimated distance is greater than the limit value and the estimated risk indicates that there is a risk of collision;

wherein:

the far range warning signal is an intermittent signal, at least one of a period and a pulse duty factor of the intermittent signal indicating the estimated risk of collision; and the near range warning signal and the far range warning signal are visual signals differing in color.

* * * * *

UNITED STATES PATENT AND TRADEMARK OFFICE
CERTIFICATE OF CORRECTION

PATENT NO.    : 6,433,679 B1
DATED         : August 13, 2002
INVENTOR(S)   : Dirk Schmid It is certified that error appears in the above-identified patent and that said Letters Patent is hereby corrected as shown below:

Column 1,
Line 11, change "known" to -- conventional --;

Column 4,
Line 22, change "s, and" to -- $s_1$, and --.

Signed and Sealed this

Twenty-seventh Day of January, 2004

JON W. DUDAS
*Acting Director of the United States Patent and Trademark Office*